(12) United States Patent
Mernyk

(10) Patent No.: US 7,924,537 B2
(45) Date of Patent: Apr. 12, 2011

(54) MISWIRING CIRCUIT COUPLED TO AN ELECTRICAL FAULT INTERRUPTER

(75) Inventor: Ross Mernyk, Brooklyn, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 209 days.

(21) Appl. No.: 12/169,948

(22) Filed: Jul. 9, 2008

(65) Prior Publication Data
US 2010/0007447 A1 Jan. 14, 2010

(51) Int. Cl.
*H02H 3/00* (2006.01)
(52) U.S. Cl. ............................................. 361/42
(58) Field of Classification Search .................. 361/42
See application file for complete search history.

(56) References Cited

U.S. PATENT DOCUMENTS

| | | |
|---|---|---|
| 2,999,189 A | 9/1961 | Gerrard |
| 3,891,894 A | 6/1975 | Scarpino |
| 3,904,859 A | 9/1975 | Poncelet |
| 4,016,488 A | 4/1977 | Stevens |
| 4,084,203 A | 4/1978 | Dietz et al. |
| 4,356,443 A | 10/1982 | Emery |
| 4,376,243 A | 3/1983 | Renn et al. |
| 4,466,071 A | 8/1984 | Russell, Jr. |
| 4,595,894 A | 6/1986 | Doyle et al. |
| 4,618,907 A | 10/1986 | Leopold |
| 4,658,322 A | 4/1987 | Rivera |
| 4,709,293 A | 11/1987 | Gershen et al. |
| 4,851,782 A | 7/1989 | Jeerings et al. |
| 4,878,144 A | 10/1989 | Nebon |
| 4,931,894 A | 6/1990 | Legatti |
| 4,933,630 A | 6/1990 | Dupraz |
| 4,939,495 A | 7/1990 | Peterson et al. |
| 5,121,282 A | 6/1992 | White |
| 5,185,684 A | 2/1993 | Beihoff et al. |
| 5,185,686 A | 2/1993 | Hansen et al. |
| 5,202,662 A | 4/1993 | Bienwald et al. |
| 5,206,596 A | 4/1993 | Beihoff et al. |
| 5,223,795 A | 6/1993 | Blades |
| 5,224,006 A | 6/1993 | MacKenzie et al. |
| 5,280,404 A | 1/1994 | Ragsdale |
| 5,383,799 A | 1/1995 | Fladung |
| 5,432,455 A | 7/1995 | Blades |
| 5,434,509 A | 7/1995 | Blades |

(Continued)

FOREIGN PATENT DOCUMENTS

CA 2224927 6/1998

(Continued)

OTHER PUBLICATIONS

International Written Opinion mailed on Jan. 15, 2009 for PCT/US2007/072659 which was filed on Jul. 2, 2007—15 pages.

(Continued)

*Primary Examiner* — Stephen W Jackson
(74) *Attorney, Agent, or Firm* — Collard & Roe, P.C.

(57) ABSTRACT

The disclosure relates to an electrical fault interrupter comprising at least one electrical fault sensor which is configured to detect an electrical fault condition, at least one miswiring circuit configured to detect the improper connection to the electrical fault sensor, and at least one circuit interrupter which is configured to open at least one circuit in the presence of an electrical fault or a miswiring condition. In at least one embodiment, one end of the miswiring circuit is coupled to a ground line.

23 Claims, 7 Drawing Sheets

U.S. PATENT DOCUMENTS

| | | | |
|---|---|---|---|
| 5,459,630 A | 10/1995 | MacKenzie et al. | |
| 5,477,412 A | 12/1995 | Neiger et al. | |
| 5,519,561 A | 5/1996 | Mrenna et al. | |
| 5,536,980 A | 7/1996 | Kawate et al. | |
| 5,561,505 A | 10/1996 | Lewis | |
| 5,561,605 A | 10/1996 | Zuercher et al. | |
| 5,590,012 A | 12/1996 | Dollar, II | |
| 5,600,524 A | 2/1997 | Neiger et al. | |
| 5,642,248 A | 6/1997 | Campolo et al. | |
| 5,680,287 A | 10/1997 | Gernhardt et al. | |
| 5,682,101 A | 10/1997 | Brooks et al. | |
| 5,689,180 A | 11/1997 | Carlson | |
| 5,706,155 A | 1/1998 | Neiger et al. | |
| 5,715,125 A | 2/1998 | Neiger et al. | |
| 5,729,145 A | 3/1998 | Blades | |
| 5,729,417 A | 3/1998 | Neiger et al. | |
| 5,805,397 A | 9/1998 | MacKenzie | |
| 5,805,398 A | 9/1998 | Rae | |
| 5,815,352 A | 9/1998 | Mackenzie | |
| 5,818,237 A | 10/1998 | Zuercher et al. | |
| 5,818,671 A | 10/1998 | Seymour et al. | |
| 5,825,598 A | 10/1998 | Dickens et al. | |
| 5,834,940 A | 11/1998 | Brooks et al. | |
| 5,835,321 A | 11/1998 | Elms et al. | |
| 5,839,092 A | 11/1998 | Erger et al. | |
| 5,847,913 A | 12/1998 | Turner et al. | |
| 5,886,606 A | 3/1999 | Tosaka et al. | |
| 5,906,517 A | 5/1999 | Crane et al. | |
| 5,940,256 A | 8/1999 | MacKenzie et al. | |
| 5,946,179 A | 8/1999 | Fleege et al. | |
| 5,963,406 A | 10/1999 | Neiger et al. | |
| 5,963,408 A | 10/1999 | Neiger et al. | |
| 5,986,860 A | 11/1999 | Scott | |
| 5,999,384 A | 12/1999 | Chen et al. | |
| 6,052,265 A | 4/2000 | Zaretsky et al. | |
| 6,088,205 A | 7/2000 | Neiger et al. | |
| 6,128,169 A | 10/2000 | Neiger et al. | |
| 6,163,188 A | 12/2000 | Yu | |
| 6,191,589 B1 | 2/2001 | Clunn | |
| 6,218,844 B1 | 4/2001 | Wong et al. | |
| 6,226,161 B1 | 5/2001 | Neiger et al. | |
| 6,246,556 B1 | 6/2001 | Haun et al. | |
| 6,246,558 B1 | 6/2001 | Di Salvo et al. | |
| 6,252,407 B1 | 6/2001 | Gershen | |
| 6,259,996 B1 | 7/2001 | Haun et al. | |
| 6,266,219 B1 | 7/2001 | Macbeth et al. | |
| 6,275,044 B1 | 8/2001 | Scott | |
| 6,282,070 B1 | 8/2001 | Ziegler et al. | |
| 6,295,190 B1 | 9/2001 | Rinaldi et al. | |
| 6,313,641 B1 | 11/2001 | Brooks | |
| 6,339,525 B1 | 1/2002 | Neiger et al. | |
| 6,359,745 B1 | 3/2002 | Thomas, III et al. | |
| 6,373,257 B1 | 4/2002 | Macbeth et al. | |
| 6,381,112 B1 | 4/2002 | DiSalvo | |
| 6,407,893 B1 | 6/2002 | Neiger et al. | |
| 6,417,671 B1 | 7/2002 | Tiemann | |
| 6,421,214 B1 | 7/2002 | Packard et al. | |
| 6,426,632 B1 | 7/2002 | Clunn | |
| 6,426,634 B1 | 7/2002 | Clunn et al. | |
| 6,433,977 B1 | 8/2002 | Macbeth | |
| 6,433,978 B1 | 8/2002 | Neiger et al. | |
| 6,437,953 B2 | 8/2002 | Di Salvo et al. | |
| 6,522,510 B1 | 2/2003 | Finlay et al. | |
| 6,538,862 B1 | 3/2003 | Mason, Jr. et al. | |
| 6,538,863 B1 | 3/2003 | Macbeth | |
| 6,545,574 B1 | 4/2003 | Seymour et al. | |
| 6,567,250 B1 | 5/2003 | Haun et al. | |
| 6,570,392 B2 | 5/2003 | Macbeth et al. | |
| 6,577,484 B1 | 6/2003 | Macbeth et al. | |
| 6,611,406 B2 | 8/2003 | Neiger et al. | |
| 6,628,486 B1 | 9/2003 | Macbeth | |
| 6,639,769 B2 | 10/2003 | Neiger et al. | |
| 6,642,832 B2 | 11/2003 | Pellon et al. | |
| 6,720,872 B1 | 4/2004 | Engel et al. | |
| 6,731,483 B2 | 5/2004 | Mason, Jr. et al. | |
| 6,734,769 B1 | 5/2004 | Germain et al. | |
| 6,771,152 B2 | 8/2004 | Germain et al. | |
| 6,782,329 B2 | 8/2004 | Scott | |
| 6,785,104 B2 | 8/2004 | Tallman et al. | |
| 6,807,035 B1 | 10/2004 | Baldwin et al. | |
| 6,807,036 B2 | 10/2004 | Baldwin | |
| 6,810,069 B2 | 10/2004 | Kojovic et al. | |
| 6,813,126 B2 | 11/2004 | Di Salvo et al. | |
| 6,856,498 B1 | 2/2005 | Finlay, Sr. | |
| 6,864,766 B2 | 3/2005 | Di Salvo et al. | |
| 6,873,231 B2 | 3/2005 | Germain et al. | |
| 6,876,528 B2 | 4/2005 | Macbeth | |
| 6,937,027 B2 | 8/2005 | Koo et al. | |
| 6,937,452 B2 | 8/2005 | Chan et al. | |
| 6,943,558 B2 | 9/2005 | Hale et al. | |
| 6,949,994 B2 | 9/2005 | Germain et al. | |
| 6,958,895 B1 * | 10/2005 | Radosavljevic et al. | ........ 361/42 |
| 6,963,260 B2 | 11/2005 | Germain et al. | |
| 6,972,572 B2 | 12/2005 | Mernyk et al. | |
| 7,003,435 B2 | 2/2006 | Kolker et al. | |
| 7,009,406 B2 | 3/2006 | Naidu et al. | |
| 7,026,895 B2 | 4/2006 | Germain et al. | |
| 7,031,125 B2 | 4/2006 | Germain et al. | |
| 7,035,066 B2 | 4/2006 | McMahon et al. | |
| 7,042,688 B2 | 5/2006 | Chan et al. | |
| 7,049,910 B2 | 5/2006 | Campolo et al. | |
| 7,049,911 B2 | 5/2006 | Germain et al. | |
| 7,064,944 B2 | 6/2006 | Kim et al. | |
| 7,068,481 B2 | 6/2006 | Radosavljevic et al. | |
| 7,088,205 B2 | 8/2006 | Germain et al. | |
| 7,088,206 B2 | 8/2006 | Germain et al. | |
| 7,091,871 B2 | 8/2006 | Howell et al. | |
| 7,099,129 B2 | 8/2006 | Neiger et al. | |
| 7,133,266 B1 | 11/2006 | Finlay | |
| 7,149,065 B2 | 12/2006 | Baldwin et al. | |
| 7,164,563 B2 | 1/2007 | Chan et al. | |
| 7,173,799 B1 | 2/2007 | Weeks et al. | |
| 7,180,299 B2 | 2/2007 | Mernyk et al. | |
| 7,180,717 B2 | 2/2007 | Kojovic et al. | |
| 7,187,526 B2 | 3/2007 | Di Salvo | |
| 7,190,562 B2 | 3/2007 | Pellon et al. | |
| 7,196,886 B2 | 3/2007 | Chan et al. | |
| 7,212,386 B1 | 5/2007 | Finlay, Sr. et al. | |
| 7,215,520 B2 | 5/2007 | Elms et al. | |
| 7,227,435 B2 | 6/2007 | Germain et al. | |
| 7,227,441 B2 | 6/2007 | Skendzic et al. | |
| 7,253,603 B2 | 8/2007 | Kovanko et al. | |
| 7,253,637 B2 | 8/2007 | Dvorak et al. | |
| 7,259,568 B2 | 8/2007 | Mernyk et al. | |
| 7,268,989 B2 | 9/2007 | Parker et al. | |
| 7,298,598 B1 | 11/2007 | Morgan et al. | |
| 7,304,820 B2 | 12/2007 | Kato et al. | |
| 7,309,993 B2 | 12/2007 | Driehorn et al. | |
| 7,319,574 B2 | 1/2008 | Engel | |
| 7,321,227 B2 | 1/2008 | Fritsch et al. | |
| 7,333,920 B2 | 2/2008 | Kolker et al. | |
| 7,365,621 B2 | 4/2008 | Germain et al. | |
| 7,400,477 B2 | 7/2008 | Campolo et al. | |
| 7,403,129 B2 | 7/2008 | Zhou et al. | |
| 7,405,569 B2 | 7/2008 | Hagel et al. | |
| 7,439,833 B2 | 10/2008 | Germain et al. | |
| 7,443,644 B2 | 10/2008 | Sung | |
| 7,463,124 B2 | 12/2008 | Di Salvo et al. | |
| 7,492,558 B2 | 2/2009 | Germain et al. | |
| 7,535,234 B2 | 5/2009 | Mernyk et al. | |
| 7,551,047 B2 | 6/2009 | Sokolow et al. | |
| 7,558,034 B2 | 7/2009 | Bonasia et al. | |
| 2002/0008597 A1 | 1/2002 | Otsuka et al. | |
| 2002/0135957 A1 | 9/2002 | Chan et al. | |
| 2003/0072113 A1 | 4/2003 | Wong et al. | |
| 2004/0223272 A1 | 11/2004 | Germain et al. | |
| 2005/0002137 A1 | 1/2005 | Germain et al. | |
| 2005/0063535 A1 | 3/2005 | Walbeck et al. | |
| 2005/0117264 A1 | 6/2005 | Aromin | |
| 2005/0191902 A1 | 9/2005 | Kim et al. | |
| 2005/0286184 A1 | 12/2005 | Campolo | |
| 2006/0139132 A1 | 6/2006 | Porter et al. | |
| 2006/0171085 A1 | 8/2006 | Keating | |
| 2006/0181373 A1 | 8/2006 | Germain et al. | |
| 2006/0285262 A1 | 12/2006 | Neiger | |
| 2007/0014058 A1 | 1/2007 | Chan et al. | |
| 2007/0091520 A1 | 4/2007 | Angelides et al. | |

| | | |
|---|---|---|
| 2007/0262780 A1 | 11/2007 | Mernyk et al. |
| 2007/0268635 A1 | 11/2007 | Bonasia et al. |
| 2008/0007879 A1 | 1/2008 | Zaretsky et al. |
| 2008/0013237 A1 | 1/2008 | Moadel et al. |
| 2008/0123227 A1 | 5/2008 | Bonasia |
| 2008/0140354 A1 | 6/2008 | Kolker et al. |
| 2008/0186642 A1 | 8/2008 | Campolo et al. |
| 2008/0248662 A1 | 10/2008 | Bazayev et al. |
| 2009/0052098 A1 | 2/2009 | Di Salvo et al. |
| 2009/0086389 A1 | 4/2009 | Huang et al. |
| 2009/0086390 A1 | 4/2009 | Huang |
| 2009/0161271 A1 | 6/2009 | Huang et al. |
| 2009/0207535 A1 | 8/2009 | Mernyk et al. |

FOREIGN PATENT DOCUMENTS

| | | |
|---|---|---|
| WO | WO2005062917 | 7/2005 |

OTHER PUBLICATIONS

Earl W. Roberts, "Ideas-Ideas-Ideas," in IAEI Jan.-Feb. 2006, visited on Nov. 15, 2007, http://www.iaei.org/subscriber/magazine /06 a/roberts.html, including Figure 1—Normal Circuit; Figure 2—Fatal Condition; and Figure 3—Fatal Condition—6 pages.

Notification of Transmittal of the International Search Report and the Written Opinion of the International Searching Authority, International Search Report, and Written Opinion mailed on Jul. 3, 2008 for PCT/US2007/072659 which was filed on Jul. 2, 2007—20 pages.

Non-Final Office Action mailed on Jun. 30, 2008 for U.S. Appl. No. 11/772,489.

Final Office Action mailed on Dec. 12, 2008 for U.S. Appl. No. 11/772,489.

Non-Final Office Action mailed on Apr. 29, 2009 for U.S. Appl. No. 11/772,489.

"Tech. for Detecting and Monitoring Conditions that Could Cause Electrical Wiring System Fires," UL Underwriters Laboratories, Inc., Sep. 1995.

International Preliminary Report on Patentability mailed on Jan. 4, 2011 for PCT Application PCT/US2007/72659; Filed on Jul. 2, 2007.

* cited by examiner

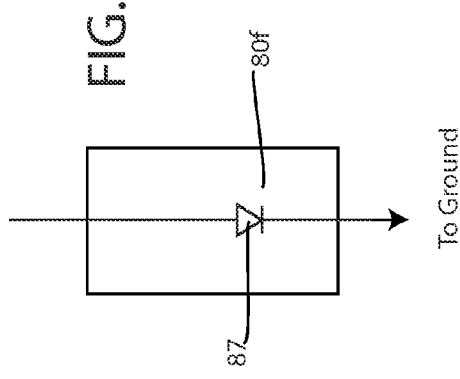
FIG. 6E
FIG. 6F
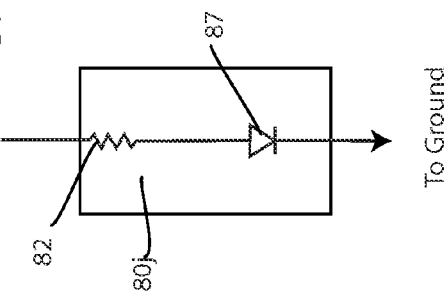
FIG. 6J
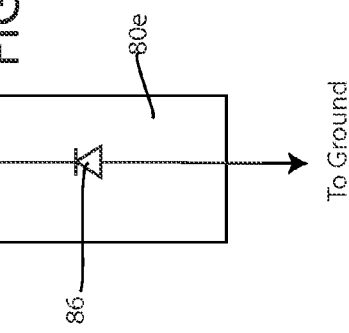
FIG. 6G
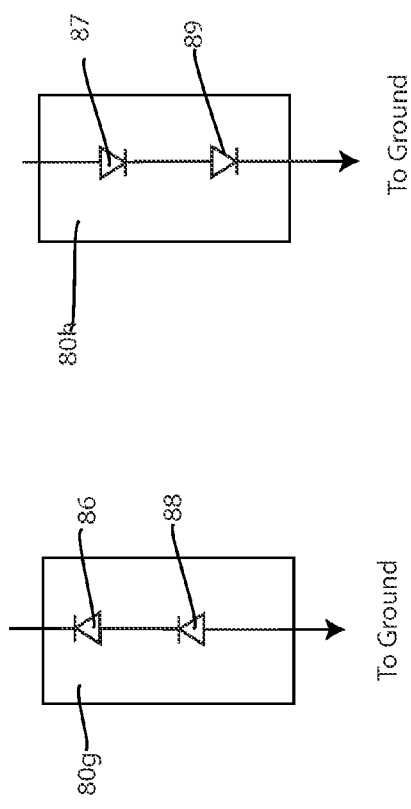
FIG. 6H

MISWIRING CIRCUIT COUPLED TO AN ELECTRICAL FAULT INTERRUPTER

BACKGROUND OF THE INVENTION

Field of the Invention

The invention relates to an electrical fault interrupter, which includes a miswiring circuit which can be used to detect the presence of a miswiring condition.

To adequately determine whether an electrical fault exists in a power distribution network into which an electrical fault interrupter has been connected, one or more sensors in the electrical fault interrupter would typically be coupled to one or more of the power conducting lines in the fault interrupter, such as phase lines, the hot line, and the neutral line. In some cases this would require the electrical fault sensor be coupled to multiple power conducting lines simultaneously or would require multiple electrical fault sensors be employed in the electrical fault interrupter. Such electrical fault sensors can be bulky as well as expensive. However, these sensors may be required to protect against electrical faults regardless of how the device is wired to a power distribution network, such as when the device is wired properly with the phase line of the power distribution network being wired to the phase line of the electrical fault interrupter, or in a miswired condition where the phase line of the power distribution network is wired instead to another line in the device such as to the neutral or ground line.

SUMMARY

One way to reduce or eliminate the requirement for an additional or more complex electrical fault sensor in an electrical fault interrupter is to include a miswiring detector which would result in either the tripping of the electrical fault interrupter or opening of the power conducting lines in the presence of a miswiring condition. Therefore at least one embodiment of the present invention relates to an electrical fault interrupter comprising at least one electrical fault sensor configured to detect one or more electrical fault conditions, at least one miswiring circuit, and at least one circuit interrupter configured to open at least one power conducting line in the presence of an electrical fault condition or a miswiring condition. In at least one embodiment, one end of the miswiring circuit is coupled to a ground line. More particularly one embodiment relates to a miswiring circuit configured to generate a miswire signal when an improper connection between a power distribution network and a line side of the fault interrupter is detected When applying a miswiring circuit to at least one electrical fault interrupter design, one benefit of the miswiring circuit is that it can be used to reduce the number of sensors required to determine the presence of an electrical fault. In at least one other electrical fault interrupter design, the miswiring circuit can be used to reduce the complexity of one or more sensors required to determine the presence of an electrical fault. In all cases, the presence of a miswiring circuit in the design would result in the tripping of the electrical fault interrupter during a miswiring condition so that at least one power conducting line is open circuited.

In the above described embodiments, the inclusion of the miswiring circuit in the electrical fault interrupter allows one or more electrical fault sensors to be reduced in number or complexity, thereby providing a device manufacturing cost reduction.

Alternatively, a miswiring circuit can be included in a device without a fault sensor. In this case, the device would be configured to activate a circuit interrupter when there is a miswire condition.

BRIEF DESCRIPTION OF THE DRAWINGS

Other objects and features of the present invention will become apparent from the following detailed description considered in connection with the accompanying drawings. It is to be understood, however, that the drawings are designed as illustrations only and not as a definition of the limits of the invention.

In the drawings, wherein similar reference characters denote similar elements throughout the several views:

FIG. 6E is a schematic diagram of another embodiment of a miswiring circuit;

FIG. 6F is a schematic diagram of another embodiment of a miswiring circuit;

FIG. 6G is a schematic diagram of another embodiment of a miswiring circuit;

FIG. 6H is a schematic diagram of another embodiment of a miswiring circuit; and FIG. 6J is a schematic diagram of another embodiment of a miswiring circuit.

DETAILED DESCRIPTION OF THE PREFERRED EMBODIMENT

Figure 1:
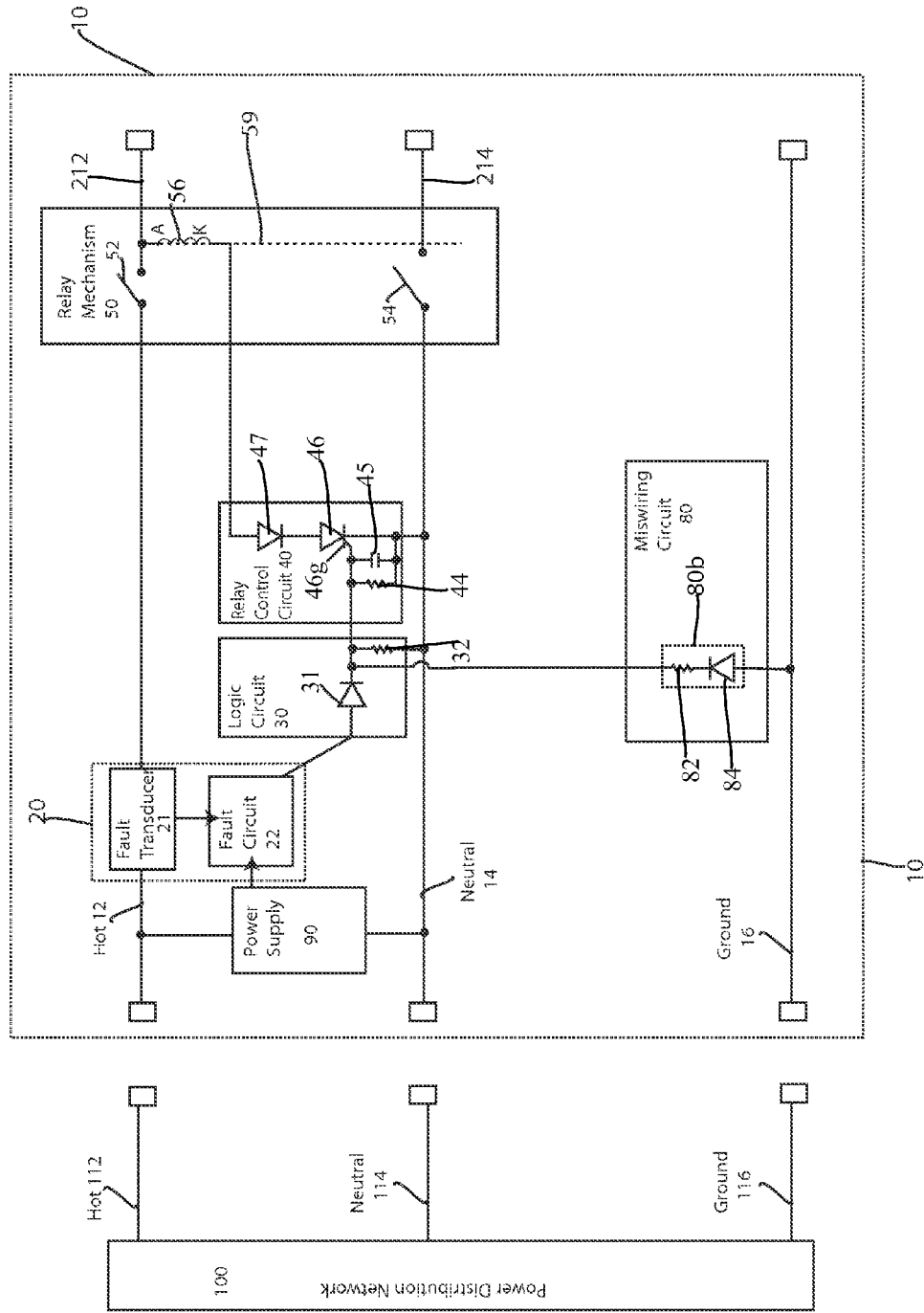
FIG. 1 is a block diagram of a system having a miswiring circuit coupled between a logic circuit and a ground line.

Referring in detail to the drawings, FIG. 1 is a block diagram of an electrical fault interrupter device 10. This device includes an electrical fault sensor 20 that can be any type of electrical fault sensor but is shown by way of example by electrical fault sensor 20. It is understood by one of ordinary skill in the art that electrical fault sensor 20 could be designed to detect ground faults, arc faults, leakage currents, residual currents, immersion, shield leakage, overcurrent, undercurrent, overvoltage, undervoltage, line frequency, noise, spike, surge, and/or any other electrical fault conditions. Thus, electrical fault sensor 20 is any type of sensor configured to detect one or more of these electrical fault conditions. Examples of sensors include arc fault sensors, ground fault sensors, appliance leakage sensors, leakage current sensors, residual current sensors, shield leakage sensors, overcurrent sensors, undercurrent sensors, overvoltage sensors, undervoltage sensors, line frequency sensors, noise sensors, spike sensors, surge sensors, and immersion detection sensors. Electrical fault sensor 20 is comprised of a transducer block referred to as fault transducer 21, and a circuitry block referred to as fault circuit 22. It is understood by one of ordinary skill in the art that a sensor block is generally comprised of a transducer block and a circuitry block, and that the type of electrical fault or faults being sensed helps guide the designer to the complexity or simplicity of the transducer block and circuitry block. Indeed one of ordinary skill in the art knows that certain electrical faults can be sensed with just an electrical connection and no transducer at all, and that certain electrical faults require little circuitry in the sensor. Further, it is understood by one of ordinary skill in the art that a sensor can produce a signal which directly indicates the detection of the electrical fault or faults the sensor is designed to detect, or instead can produce a signal which requires further electronic and/or computational analysis in order to determine whether the electrical fault or faults have occurred. An example of a fault signal is a signal produced by a fault sensor which has characteristics which would ultimately activate the relay control circuit. These characteristics can include a sufficient voltage to activate a logic circuit such as logic circuit 30 or a relay control circuit such as relay control circuit 40. In embodiments where electrical fault detection requires further electronic and/or computational analysis, one of ordinary skill in the art will recognize that the fault signal described herein as being produced by electrical fault sensor 20 is the signal indicating that a fault condition has been detected, and thus is the output of the further electronic and/or computational analysis when such analysis is required.

Electrical fault interrupter 10 also includes at least one miswiring circuit 80, and at least one circuit interrupter, which can be in the form of any known circuit interrupter but is shown by way of example by relay mechanism 50. Examples of relay mechanisms which could be used in electrical fault interrupter 10 include mousetrap relays, electrically held relays, reset lockout relays, off-the-shelf held relays, bistable relays, circuit breakers, contactors, and fuses, and one of ordinary skill in the art will understand how to adapt any of these relay mechanisms to be used in electrical fault interrupter 10.

Miswiring circuit 80 is configured to generate a miswire signal when an improper connection from power distribution network 100 to electrical fault sensor 20 is detected. A miswire signal is any signal generated by the miswiring circuit that would indicate that the device has been miswired. An example of a miswire signal is a signal produced by miswiring circuit having a sufficient set of characteristics to activate components such as logic circuit 30, relay control circuit 40, relay mechanism 50, or microcontroller 60. These characteristics can include a sufficient voltage or frequency to activate these components. While this embodiment discloses the miswiring circuit incorporated into a device having a fault sensor, a fault sensor is not required for this miswiring circuit to operate. Therefore, at least one embodiment includes the miswiring circuit without the fault sensor. In this case, the miswiring circuit would operate separate from the fault sensor and activate a circuit interrupter alone when a device is miswired.

Relay mechanism 50 is configured to open at least one power conducting line in the presence of an electrical fault condition or a miswiring condition. While electrical fault interrupters including the electrical fault interrupter of the present invention can be employed in single phase or multi-phase power distribution systems, this embodiment of the present invention is disclosed in a single phase system that includes power distribution network 100 hot line 112 which is intended to be connected to electrical fault interrupter hot line 12, power distribution network 100 neutral line 114 which is intended to be connected to electrical fault interrupter neutral line 14, and power distribution network 100 ground line 116 which is intended to be connected to electrical fault interrupter ground line 16. Relay mechanism 50 is configured to electrically disconnect at least one power conducting line when an electrical fault or miswire condition is detected. This embodiment of the present invention is disclosed with relay mechanism 50 disconnecting hot line 212 and neutral line 214 via relay mechanism 50 conducting arms 52 and 54 respectively.

In this embodiment, power distribution network 100 provides three lines: hot 112, neutral 114, and ground 116. Power distribution network 100 is in the form of a power producing network such as power that is supplied from a power supply plant. While the power received from power distribution network 100 can be in the form of any acceptable power, in at least one embodiment this power is be in the form of 120 volts, at 60 Hertz. The three power lines 112, 114, and 116 are normally wired to electrical fault interrupter 10 hot 12, neutral 14, and ground 16 respectively. Lines 12, 14 and 16 are referred to as hot, neutral, and ground based upon their intended wiring connections. However, if power distribution network 100 hot 112 is wired to electrical fault interrupter 10 ground 16, then ground 16 is indeed hot, though it continues to be referred to as ground 16.

Electrical fault interrupter 10 also includes power supply 90, which is coupled between hot 12 and neutral 14, and which derives one or more AC and/or DC voltages for use by electrical fault interrupter 10 circuitry. For example, fault circuit 22 may include a GFCI detection chip like the National Semiconductor LM1851 which requires approximately 26 volts DC to operate properly, and in such case power supply 90 would provide 26 volts DC to fault circuit 22. Similarly logic circuit 30 may include digital logic chips like the 74HC00, in which case power supply 90 would provide 5 volts DC to logic circuit 30. It is understood by one of ordinary skill in the art that power supply 90 can be implemented together or in separate areas of the circuitry of electrical fault interrupter 10, can derive its power from any suitable lines coming from power distribution network 100, can derive clean or rippling or noisy power levels that still allow proper operation of electrical fault interrupter 10, and can exploit power-deriving features which are part of any of the other blocks in electrical fault interrupter 10. For example, the National Semiconductor LM1851 chip effectively has a 26 volt Zener diode built into its power pin, which can be exploited to create the 26 volts DC the chip requires.

While a logic circuit and relay control circuit are not required for the embodiments shown, the embodiment disclosed in FIG. 1 opens one or more power conducting lines as follows: Logic circuit 30 includes diode 31 and resistor 32 which together perform a "wired OR" function with the fault signal from electrical fault sensor 20 and miswire signal from miswiring circuit 80. The fault signal is active, for example +5 volts DC relative to neutral 14, when electrical fault sensor 20 detects an electrical fault. Miswiring circuit 80 includes circuitry 80b (See FIG. 6B) which includes diode 86 and resistor 82, which together produce a miswire signal which will be high relative to neutral 14 if and only if ground 16 becomes higher in voltage than neutral 14. Many power distribution networks, including the type exemplified as power distribution network 100, tie neutral 114 and ground 116 together electrically at the service panel. Thus, if electrical fault interrupter 10 is properly wired, neutral 14 and ground 16 will be at the same voltage. But if electrical fault interrupter 10 is improperly wired such that hot 12 is wired to neutral 114, and neutral 14 is wired to hot 112, then ground 16 will not be at the same voltage as neutral 14. This situation is called a hot-neutral miswire, and results in a miswire signal which is high relative to neutral 14 for half of each power cycle. Logic circuit 30 thus will raise the voltage at the gate of SCR 46 which is filtered by resistor 44 and capacitor 45, thus activating SCR 46 when either the fault signal or miswire signal is active. Once SCR 46 is activated, current will flow through solenoid 56 and diode 47 to cause mechanical linkage 59 to disconnect power conducting lines 212 and 214.

While FIG. 1 discloses logic circuit 30 as discrete components, it is understood by one of ordinary skill in the art that logic circuit 30 can be implemented using digital or mixed mode chips such as those in the 74HC00 logic family, or can be implemented using any microcontroller chip and associated support circuitry, with the ground pins of the digital or mixed mode chips or microcontroller chip tied to an appropriate circuit reference level, for example tied to neutral 14 in FIG. 1. Thus the digital or mixed mode chips or microcontroller chip perform the "wired OR" function disclosed in FIG. 1 as being performed by diode 31 and resistor 32, activating gate 46g of SCR 46 when either the fault signal or miswire signal is active, thus disconnecting power conducting lines 212 and 214.

Figure 2:
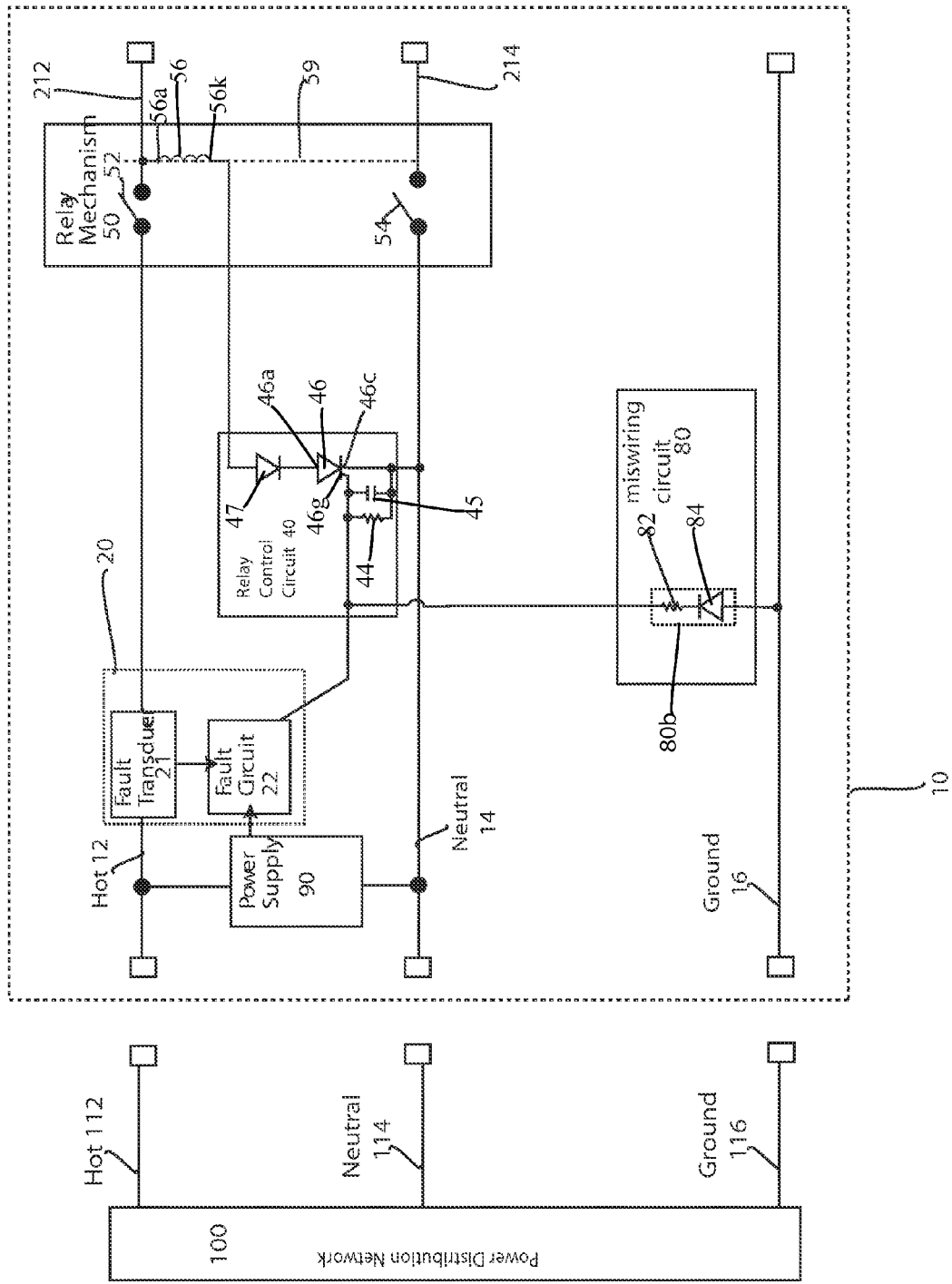
FIG. 2 is a block diagram of a system having a miswiring circuit coupled between a relay control circuit and a ground line.

FIG. 2 is a block diagram of another embodiment of an electrical fault interrupter having a miswiring circuit. Electrical fault sensor 20, miswiring circuit 80, power supply 90, relay control circuit 40, and relay mechanism 50, all operate in essentially the same manner as in the FIG. 1 embodiment. The difference between the embodiments is that the FIG. 2 embodiment lacks an explicit logic circuit 30, and has its miswiring circuit 80 coupled between relay control circuit 40 and ground line 16. Understanding that SCRs inherently have sensitive gates, one of ordinary skill in the art will understand that the "wired OR" function described in the FIG. 1 embodiment of the present invention can be performed at SCR 46 gate 46g, by directly connecting the fault signal from electrical fault sensor 20 with the miswire signal from miswiring circuit 80, at gate 46g.

Figure 3:
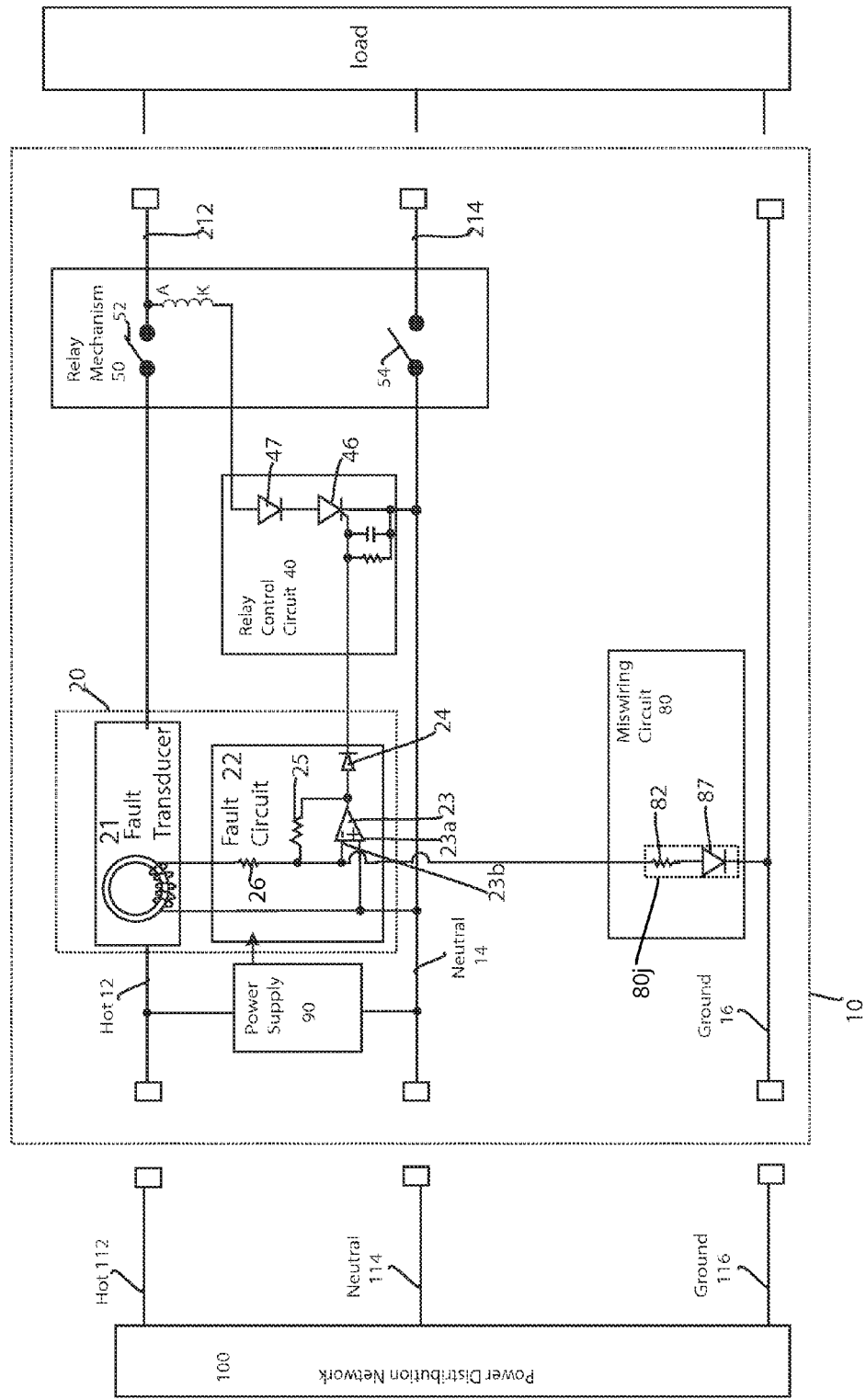
FIG. 3 is a block diagram of a system having a miswiring circuit coupled between an electrical fault sensor and a ground line.

FIG. 3 is a block diagram of another embodiment of an electrical fault interrupter having a miswiring circuit. Power supply 90, relay control circuit 40, and relay mechanism 50, all operate in essentially the same manner as in the FIG. 1 embodiment. Electrical fault sensor 20 is disclosed in FIG. 3 in a generic form of an overcurrent sensor, and otherwise operates in essentially the same manner as in the FIG. 1 embodiment, generating a fault signal, for example +5 volts DC relative to neutral 14, when electrical fault sensor 20 detects an overcurrent condition. In this embodiment, fault transducer 21 includes a transformer configured to sense current flow in hot 12, and fault circuit 22 includes opamp 23 with gain resistors 25 and 26 and output rectifier diode 24, configured to amplify the current signal from fault transducer 21 and to generate a fault signal when that current signal is above a predetermined threshold.

Miswiring circuit 80 includes circuitry 80j which includes diode 87 and resistor 82, which together produce a miswire signal which will be low relative to neutral 14 if and only if ground 16 becomes lower in voltage than neutral 14. In a similar manner to the description for the embodiment of FIG. 1, this miswire signal will be generated during a hot-neutral miswire, and results in a miswire signal which is low relative to neutral 14 for half of each power cycle.

In this embodiment, miswiring circuit 80 is coupled between electrical fault sensor 20 and ground 16, and more particularly between opamp inverting input 23b and ground 16. Opamp 23 has an inverting input 23b and a noninverting input 23a. The miswire signal from miswiring circuit 80 mixes a negative current into opamp 23 inverting input 23b, causing opamp 23 to drive its output high, thereby activating SCR 46 in a manner similar to the one described for the embodiment of FIG. 1, and ultimately resulting in the disconnection of power conducting lines 212 and 214 in response to the fault signal or miswire signal.

While FIG. 3 discloses fault circuit 22 as discrete components, it is understood by one of ordinary skill in the art that fault circuit 22 can be implemented using digital or mixed mode chips such as those in the 74HC00 logic family and/or LM linear family, or can be implemented using any microcontroller chip and associated support circuitry, with the ground pins of the digital or mixed mode or linear chips or microcontroller chip tied to an appropriate circuit reference level, for example tied to neutral 14 in FIG. 3. Thus, the digital or mixed mode or linear chips or microcontroller chip perform the "wired OR" function described in the FIG. 1 embodiment of the present invention.

Figure 4:
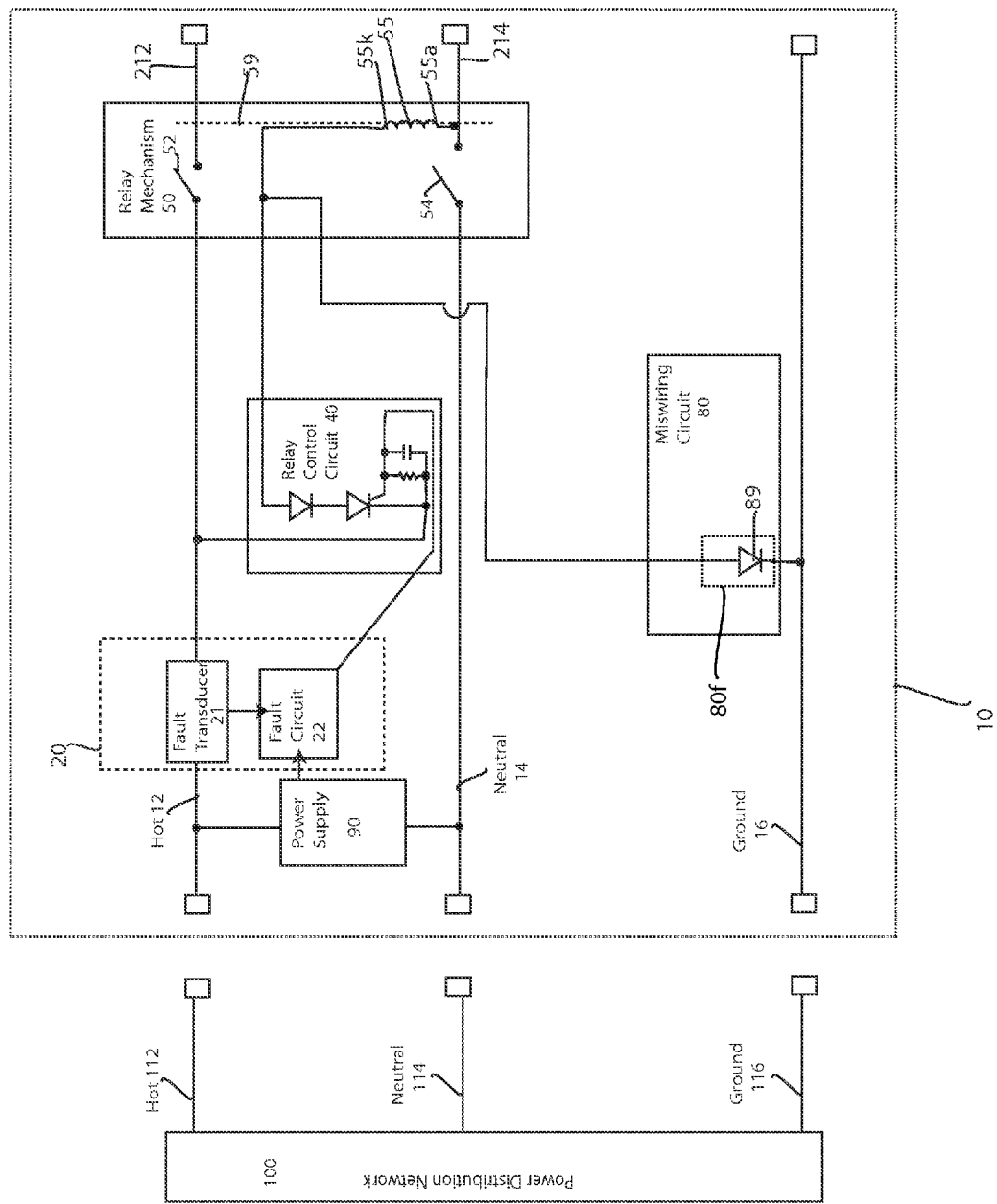
FIG. 4 is a block diagram of a system having a miswiring circuit coupled between a relay mechanism and a ground line.

FIG. 4 is a block diagram of another embodiment of an electrical fault interrupter having a miswiring circuit. The two main differences between the embodiment of FIG. 1 and that of FIG. 4 is that the FIG. 4 embodiment has its circuitry referenced to hot 12 instead of neutral 14, and that in the FIG. 4 embodiment miswiring circuit 80 is coupled between relay mechanism 50 and ground 16. Electrical fault sensor 20 can be any type of electrical fault sensor as described for the FIG. 1 embodiment, and has its fault transducer 21 and fault circuit 22 referenced to hot 12. It is understood by one of ordinary skill in the art that referencing sensors in this manner can reduce noise and improve sensor measurement accuracy. Electrical fault sensor 20 generates a fault signal when it detects an electrical fault condition.

Power supply 90 is coupled between hot 12 and neutral 14, and derives one or more AC and/or DC voltages for use by electrical fault interrupter 10 circuitry. As described for the embodiment in FIG. 1, power supply 90 may be implemented together or in separate areas of the circuitry, may derive its power from any suitable lines coming from power distribution network 100, may derive clean or rippling or noisy power levels, and may exploit power-deriving features which are part of any of the other blocks in electrical fault interrupter 10.

Relay control circuit 40 operates as in the FIG. 1 embodiment except that it is referenced to hot 12 instead of neutral 14. Thus, when electrical fault sensor 20 produces a fault signal of for example +5 volts above hot 12, the SCR in relay control circuit 40 activates, which energizes solenoid 55 of relay mechanism 50 resulting in the disconnection of power conducting lines 212 and 214.

Miswiring circuit 80 in this embodiment includes circuitry 80f (se FIG. 6F) which includes diode 87, coupled between solenoid 55 cathode 55k and ground 16. Coupled in this way, miswiring circuit 80 activates solenoid 55 if and only if the voltage on ground 16 falls below the voltage on neutral 14. Thus in the hot-neutral miswire condition described earlier, miswiring circuit 80 would generate a miswire signal for half of each power cycle, thereby activating solenoid 55 and resulting in the disconnection of power conducting lines 212 and 214.

As described in the FIG. 1 embodiment, relay mechanism 50 of the FIG. 4 embodiment can be in the form of any known circuit interrupter, is configured to open at least one power conducting line in the presence of an electrical fault condition or a miswiring condition, and can be employed in multi-phase power distribution systems though in the FIG. 4 embodiment is disclosed in a single phase power distribution system.

Figure 5:
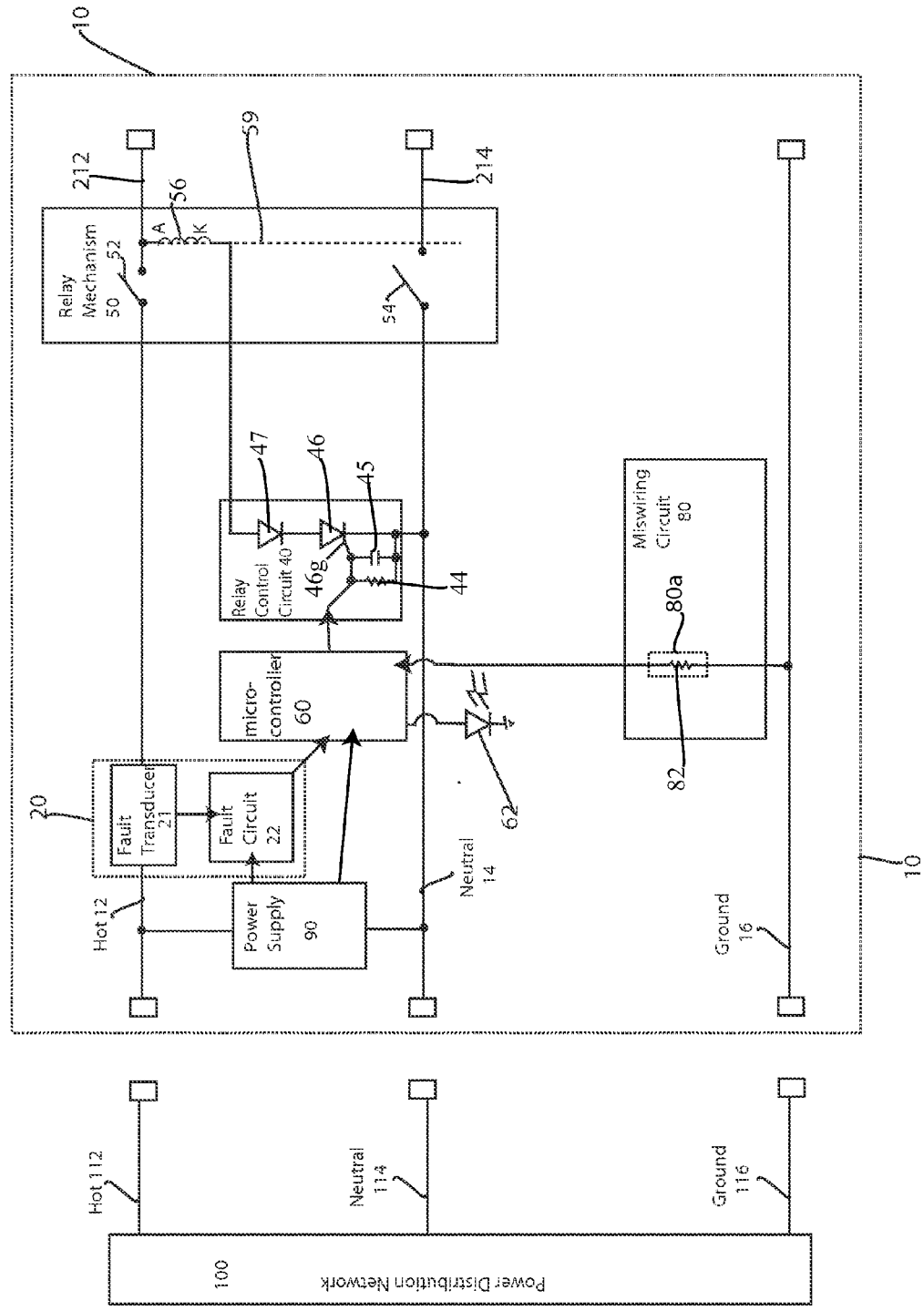
FIG. 5 is a block diagram of a system having a miswiring circuit coupled between a microcontroller and a ground line.

FIG. 5 is a block diagram of another embodiment of an electrical fault interrupter having a miswiring circuit. Electrical fault sensor 20, power supply 90, relay control circuit 40, and relay mechanism 50, all operate in essentially the same manner as in the FIG. 1 embodiment. The difference between the embodiments is that the FIG. 5 embodiment includes microcontroller 60 instead of the FIG. 1 embodiment's logic circuit 30, the FIG. 5 embodiment miswiring circuit 80 is shown in block form coupled between microcontroller 60 and ground 16, and the FIG. 5 miswiring circuit 80 including for example circuitry 80a (See FIG. 6A) is disclosed with respect to several embodiments of miswiring circuit 80 shown in FIGS. 6A-6J.

Microcontroller 60 is designed and programmed to receive the fault signal from fault sensor 20 and miswire signal from miswiring circuit 80, and to activate the gate of SCR 46 when either signal is active. If electrical fault sensor 20 is of the type which produces a signal which requires further electronic and/or computational analysis in order to detect the electrical fault or faults of interest, microcontroller 60 would perform such electronic and/or computational analysis, and use the result of that analysis as the fault signal in determining whether to activate the gate of SCR 46. It is understood by one of ordinary skill in the art that microcontroller 60 can be implemented using any appropriate technology, including but not limited to a microcontroller, microprocessor, finite state machine, programmable logic array, ASIC, gate array, PLC, control board, microcomputer, or other similar processing device. Therefore, microcontroller 60 represents any one of the above examples.

Miswiring circuit 80 produces a miswire signal when miswiring circuit 80 detects a miswire condition, and microcontroller 60 responds to the miswire signal by activating the gate of SCR 46 which energizes solenoid 55 of relay mechanism 50 resulting in the disconnection of power conducting lines 212 and 214. Though not a requirement of the present invention, microcontroller 60 can also be employed to perform further electronic and/or computational analysis on the miswire signal from miswiring circuit 80. Such electronic and/or computational analysis would be desirable in order to prevent a false trip due to electrical noise in power distribution network 100. Such electronic and/or computational analysis would be especially useful in multi-phase environments where microcontroller 60 could be used to determine which power conductor electrical fault sensor 20 is connected to, by analyzing the phase and period of the signal from miswiring circuit 80. Such electronic and/or computational analysis would also be useful if microcontroller 60 were referenced to hot, because the signal coming from miswiring circuit 80 would be perceived by microcontroller 60 as alternating high/low at line frequency when wired properly, thus requiring timing analysis of that signal to detect a miswire condition. In such a case, an example of the timing analysis microcontroller 60 would perform would be to track how long since the most recent transition of the signal from miswiring circuit 80, and if there is no transition for a full line frequency cycle or any other predetermined interval, then consider the miswire signal true and activate SCR 46 to disconnect power.

Since microcontroller 60 knows whether it activated SCR 46 due to an electrical fault or miswire condition, microcontroller 60 could activate one or more LEDs or other annunciators, such as led 62, to indicate to the user that electrical fault interrupter 10 tripped and why.

The embodiments disclosed in FIG. 1 through FIG. 5, have been disclosed with line side circuit power and load side solenoid power. One of ordinary skill in the art understands how to use other power source arrangements while keeping with the spirit and scope of the invention.

It is understood by one of ordinary skill in the art that miswiring circuit 80 can be designed using various circuit topologies, discrete or integrated components, and be passive or active.

FIG. 6A through FIG. 6J disclose several exemplary embodiments of miswiring circuit 80. Other alternatives can also be used.

Figure 6A:
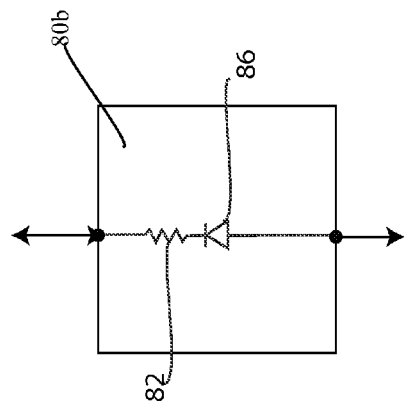
FIG. 6A is a schematic diagram of one embodiment of a miswiring circuit.
Figure 6B:
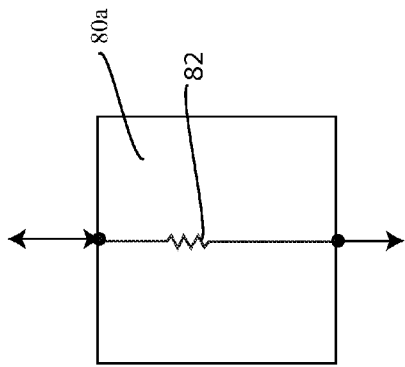
FIG. 6B is a schematic diagram of another embodiment of a miswiring circuit.
Figure 6C:
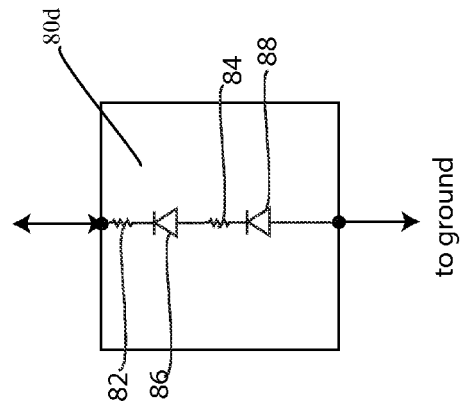
FIG. 6C is a schematic diagram of another embodiment of a miswiring circuit.
Figure 6D:
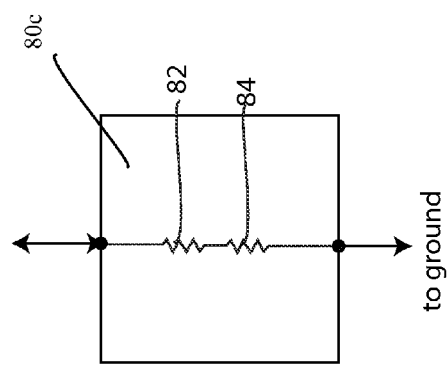
FIG. 6D is a schematic diagram of another embodiment of a miswiring circuit.

For example, FIG. 6A discloses a miswiring circuit 80a, having a resistor 82. FIG. 6B discloses a miswiring circuit 80b having a resistor 82 and a diode 86. FIG. 6C discloses a miswiring circuit 80c having two resistors 82 and 84 in series. FIG. 6D discloses a miswiring circuit having two resistors 82 and 84 and two diodes 86 and 88 with the resistors and diodes being coupled in series. While these resistors and diodes are shown in alternating order, the miswiring circuit can include these resistors and diodes in any order. FIG. 6E discloses a miswiring circuit 80e having a single diode 86. FIG. 6F discloses a miswiring circuit having a single diode 87 directed in an opposite direction from diode 86. FIG. 6G discloses a miswiring circuit 80g having two diodes 86 and 88 in series. FIG. 6H discloses a miswiring circuit 80h having two diodes 87 and 89 in series which are directed in an opposite direction as compared with diodes 86 and 88. FIG. 6J discloses a miswiring circuit 80j having a resistor 82 and a diode 87 in series, with diode 87 being directed in an opposite direction to that of diode 86 shown in FIG. 6B. One of ordinary skill in the art will understand how to adapt any one of these miswiring circuits 80a-80j to be used for the generic miswiring circuit 80 shown in FIGS. 1-5. In all embodiments of the miswiring circuit, the miswiring circuit generates a signal which may or may not require further electronic and/or computational analysis, but which always ultimately results in at least one circuit within the electrical fault interrupter to open.

Accordingly, while only a few embodiments of the present invention have been shown and described, it is obvious that many changes and modifications may be made thereunto without departing from the spirit and scope of the invention.

What is claimed is:

1. An electrical fault interrupter device comprising:
   a) a plurality of conductors comprising a ground line, a phase line, and a neutral line;
   b) a miswiring circuit configured to generate a miswire signal when an improper connection between a power distribution network and at least one of said conductors on a line side of the fault interrupter is detected, wherein said miswiring circuit is coupled to said ground line; and
   c) a circuit interrupter configured to open at least one circuit in response to said miswire signal.

2. An electrical fault interrupter device comprising:
   a) a plurality of conductors comprising a phase conductor, a neutral conductor and a ground conductor;
   b) an electrical fault sensor configured to generate a fault signal when at least one fault condition is detected;
   c) a miswiring circuit configured to generate a miswiring signal when an improper connection between a power distribution network and at least one of said conductors is detected wherein said miswiring circuit is coupled to said ground conductor; and
   d) a circuit interrupter configured to open at least one circuit in response to said fault signal or said miswiring signal.

3. The device as in claim 2, wherein said electrical fault sensor is selected from a group consisting of an arc fault sensor, a ground fault sensor circuit, an appliance leakage sensor, and an immersion detection sensor leakage current sensor, residual current sensor, shield leakage sensor, overcurrent sensor, undercurrent sensor, overvoltage sensor, undervoltage sensor, line frequency sensor, noise sensor, spike sensor, and surge sensor.

4. The device as in claim 2, wherein said fault sensor comprises an integrated circuit electrically coupled to a transformer.

5. The device as in claim 1, further comprising a logic circuit configured to receive a signal from said fault circuit and which has an output coupled to said circuit interrupter.

6. The device as in claim 5, wherein said miswiring circuit is electrically coupled at a first end to said logic circuit and electrically coupled at a second end to said at least one ground line.

7. The device as in claim 1, wherein said miswiring circuit comprises at least one resistor.

8. The device as in claim 1, wherein said miswiring circuit comprises at least one diode.

9. The device as in claim 1, further comprising at least one conductor, wherein said at least one miswiring circuit is coupled between said at least one circuit interrupter and said at least one conductor.

10. The device as in claim 9, wherein said at least one conductor is a ground conductor, and wherein the device further comprises at least one phase conductor and at least one neutral conductor.

11. The device as in claim 9, wherein said circuit interrupter comprises at least one relay control circuit, and at least one relay mechanism.

12. The device as in claim 11, wherein said miswiring circuit is coupled between said at least one relay control circuit and said at least one line.

13. The device as in claim 11, wherein said relay control circuit comprises at least one SCR.

14. The device as in claim 12, wherein said relay control circuit further comprises at least one diode.

15. The device as in claim 1, wherein said fault sensor circuit comprises an integrated circuit, and wherein said miswiring circuit is coupled between said integrated circuit and said ground conductor.

16. The device as in claim 1, wherein said fault sensing circuit comprises a microcontroller, and wherein said at least one miswiring circuit is coupled between said microcontroller and said ground line.

17. A process for disconnecting an input of a wiring device if the input is miswired comprising:
  a) coupling a miswiring circuit of the wiring device between a ground conductor, and a sensor coupled to a neutral conductor;
  b) detecting a voltage on a ground conductor;
  c) comparing said voltage on said ground conductor to said voltage on said neutral conductor
  d) indicating the presence of miswiring.

18. The process as in claim 17, further comprising the step of determining the presence of a miswiring condition by determining whether a sufficient voltage is present between said neutral conductor and said ground conductor.

19. The process as in claim 17, further comprising the step of determining the presence of a miswiring condition by determining whether a sufficient frequency is present on said ground conductor.

20. The device as in claim 2, further comprising at least one microcontroller, wherein said miswiring circuit is coupled between said ground line and said microcontroller.

21. The device as in claim 2, wherein said miswiring circuit is coupled between said electrical fault sensor and said ground line.

22. The device as in claim 2, wherein said miswiring circuit is coupled between said circuit interrupter and said ground line.

23. The process as in claim 17, wherein said step of detecting a voltage on a ground conductor comprises: using at least one of a microcontroller, a fault circuit or a circuit interrupter to detect the voltage.

* * * * *